July 30, 1946.  W. P. WILLS  2,404,894

MEASURING APPARATUS

Original Filed Nov. 15, 1938

*INVENTOR.*
WALTER P. WILLS.

BY

*C. B. Spangenberg*
ATTORNEY.

Patented July 30, 1946

2,404,894

UNITED STATES PATENT OFFICE 2,404,894

MEASURING APPARATUS

Walter P. Wills, Philadelphia, Pa., assignor to The Brown Instrument Company, Philadelphia, Pa., a corporation of Pennsylvania Original application November 15, 1938, Serial No. 240,594. Divided and this application September 25, 1942, Serial No. 459,638

12 Claims. (Cl. 172—239)

A prior application Serial No. 240,594, filed November 15, 1938, by Thomas R. Harrison and myself as joint inventors and issued into Patent 2,300,742 on November 3, 1942, discloses certain improvements in methods of and apparatus for preventing hunting in automatic recording and controlling systems. Said prior application discloses certain improvements in methods of and apparatus for the measurement of minute electrical currents or potentials and their utilization for control and analogous purposes which were not the joint invention of the applicants who made said prior application and are my sole invention and are disclosed and claimed by me in the present application, which under the circumstances is to be regarded as a division of said prior application.

A general object of the invention is to provide an improved method of measuring and/or recording potential or current variations of minute magnitude.

A more specific object of the invention is to provide a method of employing current or potential variations of minute magnitude to control the operation of electro-mechanical apparatus.

A still more specific object of the invention is to provide an improved method of and apparatus for eliminating the effects of spurious electrical effects upon the operation of apparatus employed for measuring the magnitude and changes in magnitude of minute electrical currents or potentials.

It is a particular object of the invention to provide a method of and apparatus for preventing the introduction of extraneous alternating currents into the measuring circuit of apparatus utilized for making measurements of minute unidirectional currents or potentials in low resistance circuits.

A serious problem in the measurement of minute unidirectional potential or current variations in low resistance circuits, particularly in potentiometric measuring circuits wherein the source of minute unidirectional potential or current is derived from a thermocouple, is the difficulty of electrically amplifying such potential or current variations. The direct amplification of minute unidirectional or current variations in low resistance circuits by means of conventional electronic amplifying circuits is difficult because changes in the spacing and relative positions of the electrodes of the amplifying tubes produce effects which are similar to and are of the same order of magnitude as the changes in the minute unidirectional potential or current under measurement.

When the source of minute unidirectional potential or current under measurement is derived from a thermocouple which is located in a furnace, the temperature of which it is desired to ascertain, additional problems in the measurement of the minute unidirectional potential or current are encountered because of the introduction of extraneous alternating currents into the measuring circuit from leakage paths in the furnace between the thermocouple and ground. By way of example, when the furnace whose temperature under measurement is an electric furnace which has heating resistance elements disposed in its walls, alternating currents frequently flow from the furnace heating elements to ground through leakage paths in the furnace walls. The thermocouple extends through the furnace walls and even though it is provided with a protecting tube some of the alternating or fluctuating currents which flow in the furnace wall leakage paths tend to flow through the thermocouple and the measuring circuit to ground. The thermocouple and measuring circuit provide a shunt path for such leakage currents to ground since a portion of the apparatus utilized for measuring the potential or current variations of the thermocouple, generally the electronic amplifier is grounded. It is noted that fluctuating currents will also tend to be established in the thermocouple and measuring circuit due to electrolytic action between the thermocouple and ground. The alternating or fluctuating currents introduced into the thermocouple and measuring circuit produce inaccuracies in the measurements obtained and render the operation of the apparatus unstable. More specifically, when a potentiometric measuring arrangement of the self balancing type is employed in conjunction with the thermocouple and electronic amplifier, such extraneous alternating currents in the thermocouple and potentiometer circuit introduce false balance points into the potentiometer and also cause erratic operation of the potentiometric rebalancing motive structure.

It is accordingly a primary object of the present invention to provide an improved method of and apparatus for measuring minute unidirectional potential or current variations produced by a thermocouple in which the difficulties pointed out above have been wholly eliminated or materially minimized.

This advantageous result is obtained in accordance with the present invention by isolating the thermocouple from the potentiometric measuring network and the associated electronic amplifying apparatus. To that end the thermocouple is periodically connected to the terminals of a condenser of suitable value which is insulated from ground, and during alternate intervals the condenser is disconnected from the thermocouple and is connected to the input terminals of the potentiometric measuring network and the associated electronic amplifier. By this means any extraneous alternating or fluctuating currents which may exist in any leakage paths from the thermocouple to ground are prevented from flowing through the potentiometric measuring network and associated electronic amplifier, and therefore, are rendered incapable of affecting the operation of the measuring apparatus. Since the condenser is insulated from ground, no leakage currents tend to flow to the condenser from the furnace leakage paths.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Figure 1:
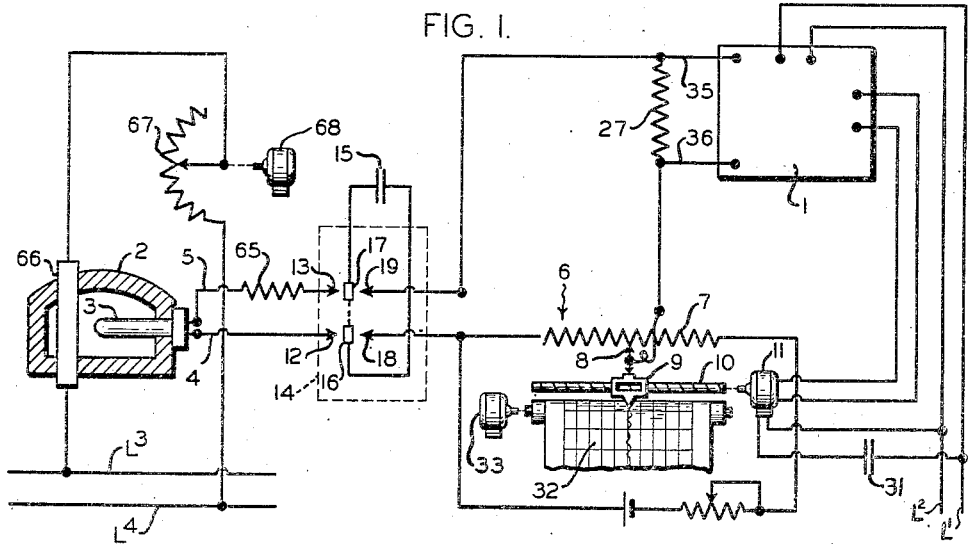
Fig. 1 is a diagrammatic representation of the use of the invention in a potentiometric recording and controlling system.
Figure 4:
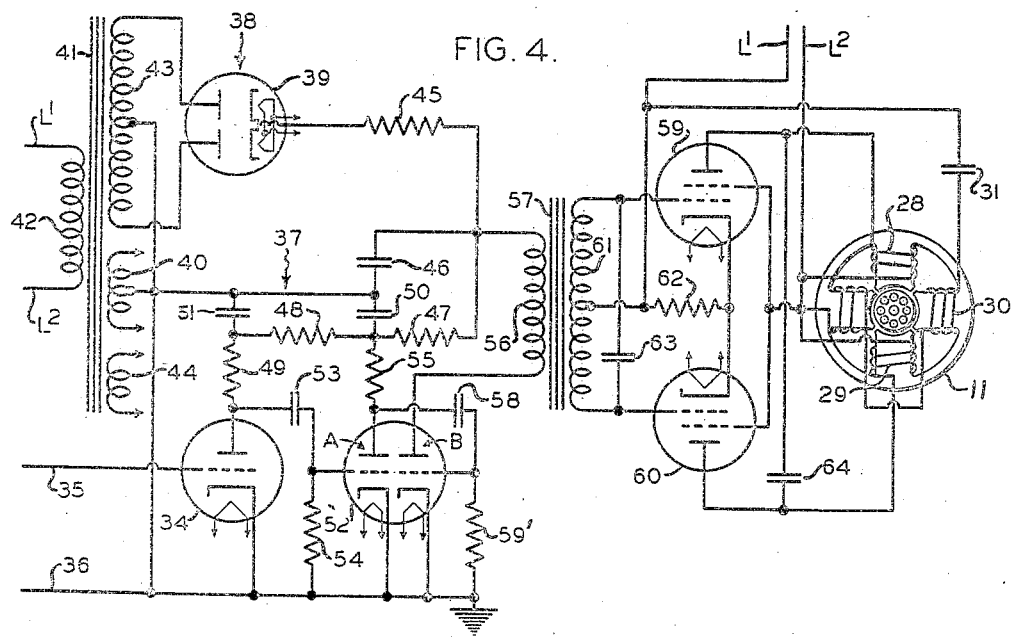
Fig. 4 illustrates schematically a form of electronic amplifier that may be employed in the Fig. 1 arrangement.

Referring more particularly to Fig. 1 of the drawing, there is illustrated in schematic form an arrangement including an electronic device 1 shown in detail in Fig. 4 for producing effects in accordance with the extent of unbalance of a potentiometric measuring network which controls the electronic device and is unbalanced in accordance with the variations in a quantity to be measured and in which because of the small magnitude of the unbalance electromotive forces, it is not practical nor desirable to have the said effects produced directly by the potentiometric measuring network.

More specifically, an arrangement is illustrated in Fig. 1 for recording and controlling the temperature of a furnace 2 in the interior of which a thermocouple 3 is arranged in heat transfer relation therewith and is responsive to slight changes in furnace temperature. The thermocouple which may be located at a distance from the remainder of the measuring apparatus has its terminals connected by a pair of conductors 4 and 5 to the terminals of a null point potentiometric measuring network 6. The potentiometric measuring network 6 includes a slidewire resistance 7 and an associated contact 8 which is capable of being moved along the length of the slidewire and may be of any suitable type for example such as the Brown potentiometric measuring network disclosed in Patent 1,898,124 issued to Thomas R. Harrison on February 21, 1933.

The movable contact 8 of the potentiometer is attached to a suitable carrier which for example may be in the form of an internally threaded nut 9 adapted to ride on a screw threaded rod 10 which is rotated in one direction or the other under control of the thermocouple 3. A suitable reversible electrical motor 11 is provided and is coupled in any convenient manner to the screw threaded rod 10 to rotate the latter at the desired speed and in the desired direction and thereby to move the contact 8 along the slidewire resistance 7 to rebalance the potentiometer 6 when the latter is unbalanced.

Figures 2, 3:
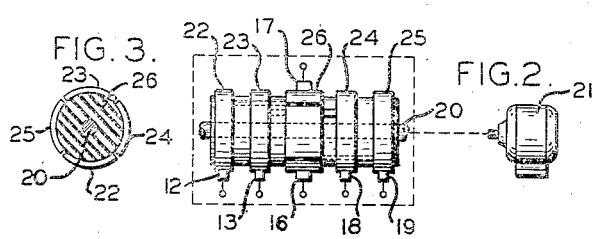
Figs. 2 and 3 illustrate in detail a form of interrupter that may be employed in the arrangement of Fig. 1.

The terminals of the thermocouple 3 are connected by the conductors 4 and 5 to the input terminals 12 and 13 respectively of a double contact interrupter 14 which is illustrated in Figs. 2 and 3. When in one position, the interrupter 14 operates to apply the potential developed by the thermocouple 3 to the terminals of a condenser 15 which is suitably insulated from ground. To this end, the interrupter 14 is provided with a movable pair of contacts 16 and 17 which are insulated from each other and from contacts 12 and 13 and are adapted to be moved into engagement with the contacts 12 and 13, respectively, when the interrupter 14 is in said one position. When the interrupter is in its other position the movable contacts 16 and 17 are in engagement with a pair of insulated contacts 18 and 19, respectively, and in this position of the interrupter the potential which was impressed on the condenser 15 by the thermocouple 3 is connected in opposition to the potentiometric potential between the left end terminal of the slidewire resistance 7 and the contact 8. It should be noted that in the last mentioned position of the interrupter 14 the thermocouple 3 is totally disconnected from the remainder of the measuring apparatus, and therefore, is effectively isolated from the remainder of the apparatus. In this manner the introduction of any extraneous fluctuating or alternating currents in the thermocouple circuit due to leakage paths which may be established between the thermocouple and ground through the walls of the furnace due to electrolytic action between the thermocouple and ground is effectively prevented from affecting the operation of the measuring apparatus. In addition, since the condenser 15 is insulated from ground, no extraneous fluctuating or alternating currents will flow to the condenser from leakage paths between the thermocouple and ground.

The form of interrupter 14 shown in Figs. 2 and 3 includes a continuously rotating shaft 20 which may be driven by any suitable form of motor such as a synchronous electric motor 21 which receives energizing current from supply conductors not shown and on which shaft are insulatingly mounted two pairs of slip rings 22, 23 and 24, 25 and a four segment commutator 26 each segment being of the same arcuate length and all insulated from each other. Brushes 16 and 17 are provided for the commutator 26 and corresponding brushes 12, 13, 18 and 19 are provided for the slip rings 22, 23, 24 and 25, respectively. Brushes 16 and 17 are connected to opposite terminals of the condenser 15 while the brushes 12 and 13 are connected to conductors 4 and 5, respectively, and the brushes 18 and 19 are connected to one end terminal of the slidewire resistance 7 and to contact 8, respectively. One opposite pair of segments on the commutator 26 are connected to the slip rings 22 and 23 and the other opposite pair of segments are connected to the slip rings 24 and 25. Thus, during each cycle of rotation of the shaft 20, one pair of segments on the commutator will be in engagement with the brushes 16 and 17 for one half cycle and during that time will close the circuit from the thermocouple leads 4 and 5 to the condenser 15. During the remaining half cycle the other pair of commutator segments will be in engagement with the said brushes to connect the potentiometer slidewire resistance 7 in circuit with the condenser 15. The speed of the motor 21 which drives the shaft 20 is so adjusted that the time for one cycle of rotation of the shaft is identical with the time of one cycle of the alternating current supplied by the conductors $L^1$ and $L^2$ in Fig. 1. The reason for so relating the speed of rotation of the motor 21 and the time of one cycle of the alternating current supplied by lines $L^1$ and $L^2$ is made apparent hereinafter.

The periodic connection of the potential produced on the condenser 15 in opposition to the potential tapped off the potentiometer slidewire resistance 7 produces a pulsating drop across a resistance 27 connected in the potentiometer circuit, which potential drop is either in phase with the voltage of the supply lines $L^1$ and $L^2$ or is displaced 180° in phase therefrom. This pulsating potential drop is impressed on the input terminals of the amplifier 1 wherein it is amplified and the amplified quantity is applied to the terminals of one winding 28 or 29 of the reversible electrical motor 11 which as illustrated in detail in Fig. 4 also includes a winding 30 which is connected to the alternating current supply lines $L^1$ and $L^2$ through a suitable condenser 31.

The reversible electrical motor 11 is of the induction variety and includes a squirrel cage rotor and two pairs of oppositely disposed field poles on which the windings 28, 29 and 30 are wound. Winding 28 is wound on one field pole of one of said pairs and winding 29 is wound on the other field pole of that pair. Winding 30 is wound on the other pair of field poles and due to the action of condenser 31 the current which flows through the winding 30 will lead the line voltage by approximately 90°. The current supplied the winding 28 by the amplifier 1 is in phase with the supply line voltage and establishes a field in the rotor which is displaced 90° in the forward direction with respect to that established therein by the winding 30. Similarly, the current supplied winding 29 by amplifier 1 is in phase with the supply line voltage, but since the winding 29 is wound on an opposite field pole from that on which the winding 28 is wound, winding 29 establishes a field in the rotor which lags by 90° that established by winding 30. Reaction between the field set up by winding 28 or 29 with that set up by winding 30 establishes a rotating field in the rotor which rotates in one direction or the other dependent upon whether winding 28 or 29 is energized and thus on the direction of potentiometric unbalance. The motor rotor is connected through suitable gearing or couplings to the screw threaded shaft 10 so that the contact 8 is adjusted along the slidewire resistance 7 in accordance with the direction of rotation of the rotor. The direction and duration of rotation of the rotor is controlled by the direction and extent of unbalance of the potentiometer so that on motor rotation, the contact 8 is adjusted in the proper direction to reduce the potentiometer unbalance.

If desired, a pen may be mounted on the carriage 9 which carries the potentiometer contact 8 and arranged in cooperative relation with a recorder chart 32 to thereby provide a continuous record of the temperature of the furnace in which the thermocouple 3 is inserted. The chart 32 may be a strip chart as shown and is adapted to be driven in any convenient manner as for example by a unidirectional motor 33 through suitable gearing (not shown), so that a record of the temperature to which the thermocouple 3 is subjected will be recorded as a continuous line on the chart.

The electronic amplifier 1 as noted hereinbefore is illustrated in detail in Fig. 4 and as shown includes an electronic valve 34 which is preferably a heater type high mu triode having an anode, cathode and a control electrode and having its input circuit connected by conductors 35 and 36 to the terminals of the resistance 27. Anode voltage is supplied the valve 34 from the terminals of a suitable filter 37 which is connected in circuit between the valve 34 and a rectifier 38. The rectifier 38 is a conventional full wave rectifier employing a rectifier valve 39 including two heater type diodes in one envelope. Energizing current is supplied the heater filaments of the diodes from the low voltage secondary winding 40 of a transformer 41 which also includes a line voltage primary winding 42, a high voltage secondary winding 43 and an additional low voltage secondary winding 44. The line voltage primary winding 42 is connected to the alternating current supply lines $L^1$ and $L^2$. The anode of the one diode of valve 39 is connected to one terminal of the winding 43 and the anode of the second diode is connected to the other terminal of the winding 43. The cathodes of the diodes are connected together and through a resistance 45 to the positive terminal of the filter 37 and the negative terminal of the latter is connected to a center-tap on the winding 43 and to a center-tap on the winding 40. The negative terminal of the filter is desirably connected to ground potential as shown.

The filter 37 includes a condenser 46 which shunts its positive and negative terminals and has its positive terminal connected to the anode of valve 34 through resistances 47, 48 and 49, and has its negative terminal connected directly to the cathode of said valve. As illustrated, the point of engagement of resistances 47 and 48 is connected by a condenser 50 to the negative terminal of the filter and the point of engagement of resistances 48 and 49 is connected by a condenser 51 thereto.

Energizing current is supplied the heater filament of valve 34 from the low voltage transformer secondary winding 44 which also supplies energizing current to the heater filaments of a twin type electronic valve 52. The flow of current through valve 34 is normally maintained at a mean value since the resistance 27 is connected directly across the input circuit thereof, but when a pulsating potential appears across the terminals of resistance 27, the conductivity of valve 34 is alternately increased and decreased resulting in a pulsating potential drop appearing across the resistance 49 in the output circuit of the valve 34.

The output circuit of valve 34 is resistance capacity coupled to the input circuit of valve 52 through a condenser 53 and a resistance 54 connected across the input circuit of valve 52. Valve 52 is a heater type valve including two triodes in one envelope. Each triode includes anode, cathode and control electrode elements. For convenience, the triode having the resistance 54 connected across its input circuit will be referred to as the triode A and the second triode will be referred to as the triode B.

Anode voltage is supplied the triodes A and B from the terminals of the filter 37, and as shown, the anode of triode A is connected through a resistance 55 to the point of engagement of resistances 47 and 48, and the anode of triode B is connected through the primary winding 56 of a transformer 57 to the positive terminal of the filter. The cathodes of triodes A and B are connected together and to the negative terminal of the filter.

The output circuit of triode A is resistance capacity coupled by a condenser 58 and a resistance 59' to the input circuit of the triode B and the output circuit of the latter is coupled by transformer 57 to the input circuit of a pair of electronic valves 59 and 60 which are connected in push-pull. The transformer 57 includes a center tapped secondary winding 61, the terminals of which are connected to a respective control electrode of the valves 59 and 60 and the center tap of which is connected through a biasing resistance 62 to the cathodes of the valves, which, as shown, are connected together. As illustrated, a condenser 63 may desirably be connected across the terminals of the transformer secondary winding 61 for tuning the latter to the frequency it is desired to amplify. Valves 59 and 60 are heater type tetrodes and include anode, cathode, heater filament, control electrode, and screen grid elements. The heater filaments of the valves 59 and 60 are energized from the winding 44.

Anode voltage may be supplied the valves 59 and 60 directly from the supply conductors $L^1$ and $L^2$, as shown, or may be supplied thereto from a suitable transformer energized by the supply line current, if desired. Winding 28 of motor 11 is connected in the anode circuit of valve 59 and winding 29 of the motor is connected in the anode circuit of valve 60.

In operation, when a pulsating potential drop is produced across resistance 27 as a result of potentiometer unbalance, the resulting amplified pulsating current flows through the transformer primary winding 56 will cause the induction of an alternating voltage across the terminals of the transformer secondary winding 61 which voltage is impressed on the input circuit of valves 59 and 60. The alternating voltage which appears across the terminals of the transformer secondary winding 61 swings the potentials of the control electrodes of the valves 59 and 60 in opposite phase at a frequency corresponding to the supply line frequency and thereby renders one valve or the other non-conductive depending upon the phase of the voltage of the transfermer secondary winding 61 with respect to the supply line voltage. The resulting deenergization of one motor winding 28 or 29 and the increased energization of the other operates to produce rotation of the motor in one direction or the other depending upon the phase of the pulsating potential drop produced across resistance 27 and thereby the direction of potentiometer unbalance. As illustrated, a condenser 64 may be desirably connected between the anodes of valves 59 and 60 to increase the available torque of the motor 11.

In order that the speed of the motor 11 may be as great as possible without overshooting of the new balance point of the potentiometric network 6 and consequent hunting taking place, means have been provided to insure that the motor speed is reduced to zero as the balance point is reached. This end is obtained by the arrangement including the condenser 15 and a resistance 65 which is inserted in the conductor 5 leading from the interrupter contact 13 to the thermocouple 3, as shown.

The operation of this arrangement including condenser 15 and resistance 65 in eliminating overshooting and consequent hunting of the potentiometric system is described in detail in the prior application, Serial No. 240,594 filed by Thomas R. Harrison and myself and referred to hereinbefore and therefore will only be briefly described herein.

With the resistance 65 and condenser 15 arranged as shown, it will be apparent that when the interrupter contacts 16 and 17 are in engagement with the contacts 12 and 13, the thermocouple 3 operates to charge the condenser 15 through the resistance 65 and the electromotive force thus developed between the condenser terminals is thereafter compared with the potentiometer electromotive force at the then position of the contact 8 along the slidewire resistance 7 when the interrupter contacts 16 and 17 are moved into engagement with the contacts 18 and 19, respectively.

With the temperature of the furnace to which the thermocouple is responsive at a predetermined value, the condenser 15 will tend to be charged through the resistance 65 until the condenser electromotive force is equal to that of the thermocouple. The contact 8 would then be in a position along the slidewire resistance 7 such that the electromotive force tapped off the slidewire 7 is exactly equal and opposite to the condenser electromotive force. For convenience, when the slidewire electromotive force is referred to hereinafter, that portion tapped off resistance 7 and opposed to the condenser electromotive force is the electromotive force intended. On a change in the temperature of the furnace, for example on an increase in temperature, the thermal electromotive force will increase the electromotive force developed across the condenser terminals. The flow of charging current to the condenser through resistance 65 will produce a potential drop across the latter, and as a result, the electromotive force developed across the condenser terminals will not assume the final value of the thermal electromotive force until the current through resistance 65 is reduced to zero or in other words until the system is again balanced. Thus, until the slidewire electromotive force is adjusted to the new value of the thermocouple electromotive force, the condenser electromotive force will tend to assume a value intermediate the thermocouple and slidewire electromotive forces. The flow of current through resistance 27 on unbalance of the condenser and potentiometer electromotive forces will operate substantially immediately to produce energization of motor 11 for rotation to effect adjustment of the contact 8 in the proper direction to reduce the unbalance between the condenser and potentiometer electromotive forces.

It is noted that there is no delaying means in the circuit through which the condenser and slidewire electromotive forces are opposed so that the amplifier 1 responds substantially immediately to unbalance in said electromotive forces to energize the motor 11 for rotation in one direction or the other to adjust the slidewire electromotive force as required to reduce the unbalance and reduce the motor energization to zero at the instant the balance between said electromotive force is restored. Due to the inertia of the motor, however, the speed of the latter will not fall off as quickly as the energization thereof and consequently, the slidewise electromotive force will tend to overshoot the value of the condenser electromotive force. As a result, the potentiometric network will be momentarily unbalanced in the opposite direction, which unbalance will produce an effect energizing the motor for rotation in the reverse direction to thereby quickly decelerate the latter. Inasmuch as the condenser electromotive force differs from the thermocouple electromotive force by an amount equal to the potential drop produced across resistance 65 by the flow of current therethrough, the contact 8 will not have reached the position along slidewire resistance 7 corresponding to the new value of thermocouple electromotive force at the instant when the condenser and slidewire electromotive forces were exactly balanced. After the condenser and slidewire electromotive forces are balanced, the condenser will not assume the thermocouple electromotive force until after the lapse of a predetermined interval required to charge the condenser to the thermocouple potential and by making this interval of the proper duration, the motor will be decelerated and ease the contact 8 gradually into its true balanced position without overshooting. The proper adjustment of the duration of the lag between the condenser and thermocouple electromotive forces may be readily effected by properly proportioning resistance 65 and condenser 15 in relation to the effective resistance of the circuit including the slidewire resistance 7 and resistance 27. When the circuit components are properly proportioned, the motor may be extremely fast in its rebalancing effect and is capable of moving the contact 8 completely along the length of the slidewire resistance 7, a distance of approximately 12" in some cases, in a fraction of a second without overshooting and consequent hunting taking place.

It will be apparent that the motor 11 may be employed to operate a control valve or rheostat for controlling the supply of heating agent to the furnace 2 to the temperature of which the thermocouple 3 is responsive, or another motor desirably operated together with the motor 11 may be so employed. For example, as shown in Fig. 1, the furnace 2 may be heated by a resistance 66 which is connected to electric supply conductors L³ and L⁴ through a rheostat 67 the adjustment of which may be effected by a motor 68. The motor 68 may be exactly like motor 11 and is connected in parallel therewith. The mechanical connection of the rheostat 67 to the motor 68 is such as to increase and decrease the supply of electric current to the resistance 66 as the temperature to which the thermocouple 3 is responsive drops below and rises above a predetermined level.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent is:

1. The method which comprises producing an E. M. F. to be measured, periodically impressing said E. M. F. on an electrical energy storing device to charge the latter, opposing the E. M. F. on said device to a known E. M. F. during each interval when said first mentioned E. M. F. is not impressed on said device whereby the resultant of said opposed E. M. F.'s creates a current of a regular frequency which can be readily amplified, amplifying said current, and applying said amplified current to effect a balance between said opposed E. M. F.'s.

2. The method which comprses producing an E. M. F. to be measured, periodically impressing said E. M. F. on an electrical capacitive reactance to charge the latter, opposing the E. M. F. on said reactance to a known E. M. F. during each interval when said first mentioned E. M. F. is not impressed on said device whereby the resultant of said opposed E. M. F.'s creates a current of regular frequency which can be readily amplified, amplifying said current at said frequency, and applying said amplified currents to effect a balance between said opposed E. M. F.'s.

3. In measuring apparatus, a circuit including a potentiometer resistance, a standard source of E. M. F. for said resistance, an electrical energy storing device, means to periodically connect a source of E. M. F. to be measured to said device to charge the latter and to connect said device in said circuit to oppose the E. M. F. on said device to said standard E. M. F. during each interval when said E. M. F. to be measured is not connected to said device to thereby create a pulsating current flow of regular frequency in said circuit, means to amplify said pulsating current, and means energized by said amplified quantity to effect a balance between said opposed E. M. F.'s.

4. In measuring apparatus, a circuit including a potentiometer resistance, a standard source of E. M. F. for said resistance, an electrical capacitive reactance, means to periodically connect a source of E. M. F. to be measured to said reactance to charge the latter and to connect said reactance in said circuit to oppose the E. M. F. on said reactance to said standard E. M. F. during each interval when said E. M. F. to be measured is not connected to said reactance to thereby create a pulsating current flow of regular frequency in said circuit, means to amplify said pulsating current, and means energized by said amplified quantity to adjust said potentiometer resistance to effect a balance between said opposed E. M. F.'s.

5. In measuring apparatus, a circuit including a potentiometer resistance, a standard source of E. M. F. for said resistance, an electrical capacitive reactance, means to periodically connect a source of E. M. F. to be measured to said reactance to charge the latter and to connect said reactance in said circuit to oppose the E. M. F. on said reactance to said standard E. M. F. during each interval when said E. M. F. to be measured is not connected to said reactance to thereby create a pulsating current flow of regular frequency in said circuit, means to amplify said pulsating current at said frequency, a source of alternating current of said frequency, a two phase rotating field motor connected to said potentiometer resistance for adjustment of the latter and having one phase energized from said source, and means to apply said amplified quantity to the other phase of said motor to control the operation of the latter and thereby the adjustment of said potentiometer resistance as required to effect a balance between said opposed E. M. F.'s.

6. In measuring apparatus, a circuit including a potentiometer resistance, a standard source of E. M. F. for said resistance, an electrical capacitive reactance, means to periodically connect a source of E. M. F. to be measured to said reactance to charge the latter and to connect said reactance in said circuit to oppose the E. M. F. on said reactance to said standard E. M. F. during each interval when said E. M. F. to be measured is not connected to said reactance to thereby create a pulsating current flow of regular frequency in said circuit, means to amplify said pulsating current, and means to utilize said amplified quantity to effect a balance between said standard E. M. F. and the E. M. F. on said reactance.

7. In measuring apparatus, a circuit including a standard source of E. M. F., an electrical energy storing device, means to periodically connect a source of E. M. F. to be measured to said device to charge the latter and to connect said device in said circuit to oppose the E. M. F. on said device to said standard E. M. F. during each interval when said E. M. F. to be measured is not connected to said device to thereby create a pulsating current flow of regular frequency in said circuit, means to amplify said pulsating current, and means to utilize said amplified quantity to effect a balance between said standard E. M. F. and the E. M. F. on said device.

8. Measuring apparatus including means for producing a variable E. M. F. to be measured, means for producing a standard E. M. F., a device having inertia for varying said standard E. M. F., a circuit in which said standard E. M. F. is permanently connected, an electrical capacitive reactance, a resistance, means to periodically connect said first mentioned E. M. F., said resistance and said reactance in series to charge the latter and to connect said reactance in said circuit to oppose the E. M. F. on said reactance to said standard E. M. F. during each interval when the E. M. F. to be measured is not connected to said reactance to thereby create a pulsating current flow of regular frequency in said circuit, means to amplify said pulsating current, and means to apply the amplified quantity to said device to control the operation of the latter, said resistance and reactance cooperating to automatically control the E. M. F. on said reactance in a predetermined manner with respect to time on a change in said first mentioned E. M. F.'s so as to cause a balance of the opposed E. M. F.'s in said circuit when the difference between said first mentioned E. M. F. and said standard E. M. F. is equal to the E. M. F. produced by said device due to its inertia following deenergization of the latter.

9. Measuring apparatus including means for producing a variable E. M. F. to be measured, means for producing a standard E. M. F., a device for varying said standard E. M. F., a motor arranged to adjust said device when energized and having the inertia characteristic which produces further adjustment of said device following deenergization, a circuit in which said standard E. M. F. is permanently connected, an electrical capacitive reactance, a resistance, means to periodically connect said first mentioned E. M. F., said resistance and said reactance in series to charge the latter and to connect said reactance in said circuit to oppose the E. M. F. on said reactance to said standard E. M. F. during each interval when the E. M. F. to be measured is not connected to said reactance to thereby create a pulsating current flow of regular frequency in said circuit, means to amplify said pulsating current, and means to apply the amplified quantity to said motor to control the operation of the latter, said resistance and reactance cooperating to automatically control the E. M. F. on said reactance in a predetermined manner with respect to time on a change in said first mentioned E. M. F. so as to cause a balance of the opposed E. M. F.'s in said circuit when the difference between said first mentioned E. M. F. and said standard E. M. F. is equal to the E. M. F. produced by said device under control of said motor following deenergization of the latter.

10. In measuring apparatus, a circuit including a potentiometer resistance, a standard source of E. M. F. for said resistance, an electrical energy storing device, a double pole-double throw switch to periodically connect a source of E. M. F. to be measured to said device to charge the latter and to totally disconnect said device from said E. M. F. to be measured and to connect said device in said circuit to oppose the E. M. F. on said device to said standard E. M. F. during each interval when said E. M. F. to be measured is not connected to said device to thereby create a pulsating current flow of regular frequency in said circuit, means to amplify said pulsating current, and means energized by said amplified quantity to effect a balance between said opposed E. M. F.'s.

11. In a measuring apparatus, a circuit including a potentiometer resistance, a standard source of E. M. F. for said resistance, an electrical capacitive reactance, a double pole-double throw switch to periodically connect a source of E. M. F. to be measured to said reactance to charge the latter and to totally disconnect said reactance from said E. M. F. to be measured and to connect said reactance in said circuit to oppose the E. M. F. on said reactance to said standard E. M. F. during each interval when said E. M. F. to be measured is not connected to said reactance to thereby create a pulsating current flow of regular frequency in said circuit, means to amplify said pulsating current at said frequency, a source of alternating current of said frequency, a two phase rotating field motor connected to said potentiometer resistance for adjustment of the latter and having one phase energized from said source, and means to apply said amplified quantity to the other phase of said motor to control the operation of the latter and thereby the adjustment of said potentiometer resistance as required to effect a balance between said opposed E. M. F.'s.

12. Measuring apparatus including means for producing a variable E. M. F. to be measured, means for producing a standard E. M. F., a device for varying said standard E. M. F., a motor arranged to adjust said device when energized and having the inertia characteristic which produces further adjustment of said device following deenergization, a circuit in which said standard E. M. F. is permanently connected, an electrical capacitive reactance, a resistance, a double pole-throw switch to periodically connect said first mentioned E. M. F., said resistance and said reactance in series to charge the latter and to totally disconnect said reactance from said first mentioned E. M. F. and to connect said reactance in said circuit to oppose the E .M. F. on said reactance to said standard E. M. F. during each interval when the E. M. F. to be measured is not connected to said reactance to thereby create a pulsating current flow of regular frequency in said circuit, means to amplify said pulsating current, and means to apply the amplified quantity to said motor to control the operation of the latter, said resistance and reactance cooperating to automatically control the E. M. F. on said reactance in a predetermined manner with respect to time on a change in said first mentioned E. M. F. so as to cause a balance of the opposed E. M. F.'s in said circuit when the difference between said first mentioned E. M. F. and said standard E. M. F. is equal to the E. M. F. produced by said device under control of said motor following deenergization of the latter.

WALTER P. WILLS.